July 22, 1958 V. S. RHEELING 2,844,388
TRUCK WHEEL GUARD AND SUPPORT FOR WARNING SIGN
Filed Oct. 2, 1956 3 Sheets-Sheet 1
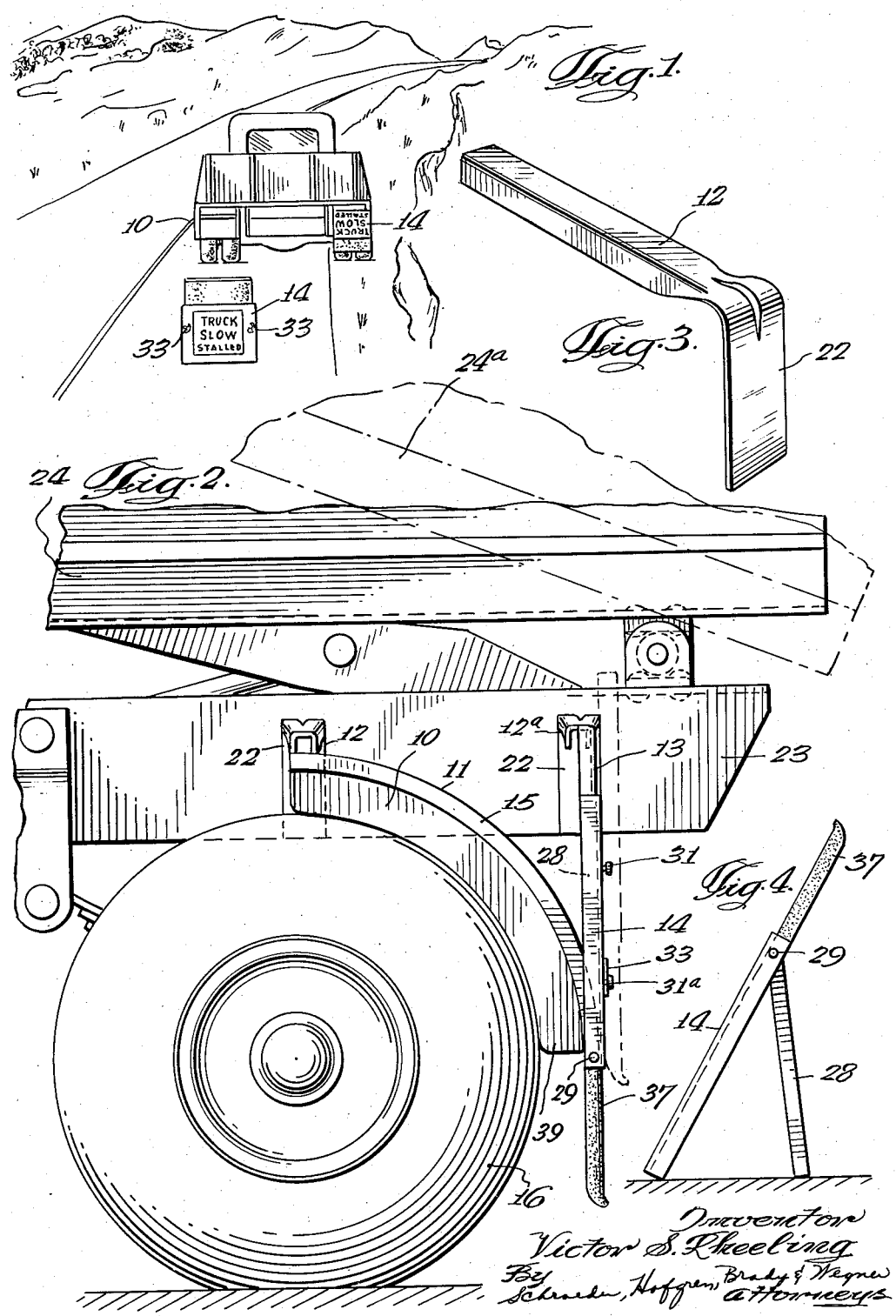

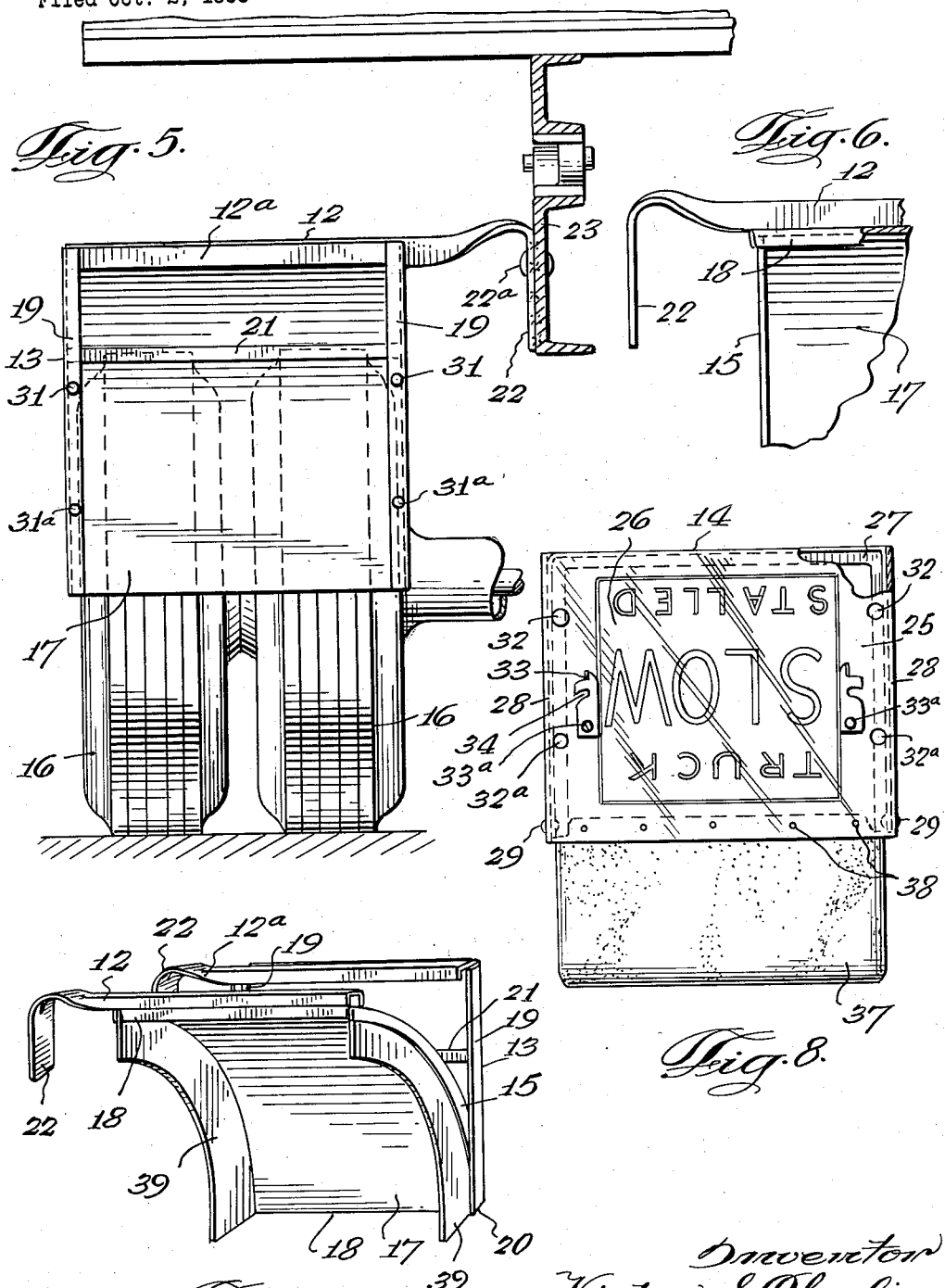

July 22, 1958    V. S. RHEELING    2,844,388
TRUCK WHEEL GUARD AND SUPPORT FOR WARNING SIGN
Filed Oct. 2, 1956    3 Sheets-Sheet 3
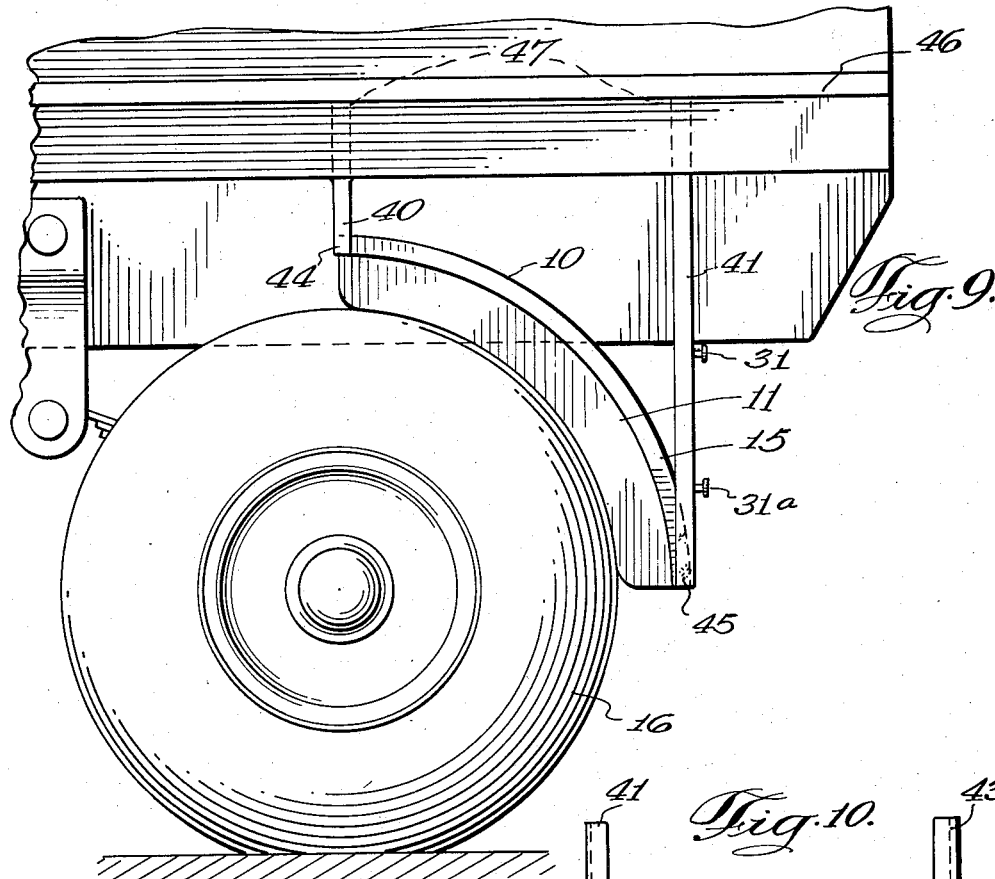
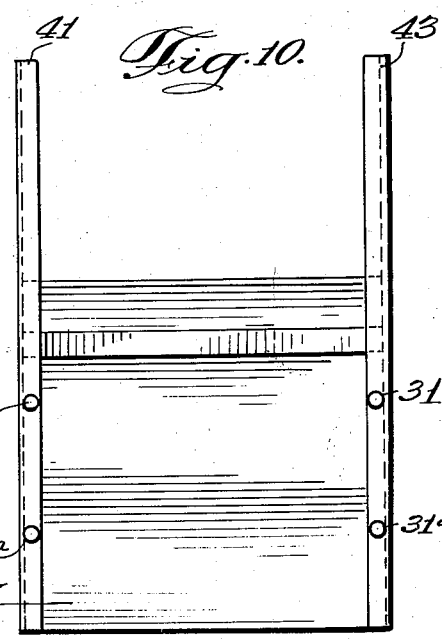
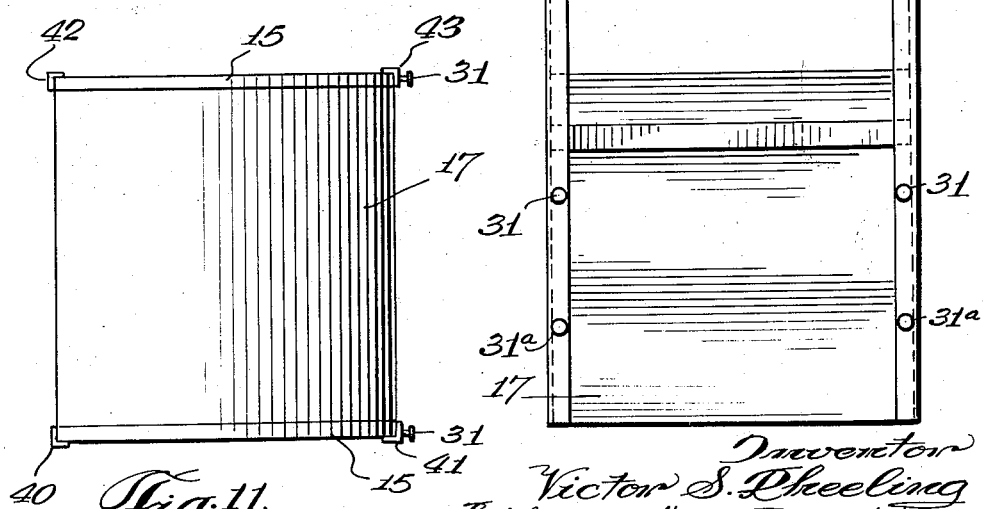

United States Patent Office 2,844,388
Patented July 22, 1958

2,844,388

TRUCK WHEEL GUARD AND SUPPORT FOR WARNING SIGN

Victor S. Rheeling, Rock Falls, Ill., assignor to Victor S. Rheeling and Harold Berg, co-partners, doing business as Rheeling Safety Splash Guard Co.

Application October 2, 1956, Serial No. 613,575

5 Claims. (Cl. 280—152)

This invention relates to an improved splash guard especially useful for the rear wheels of vehicles, particularly trucks and other large vehicles.

This application is a continuation-in-part of my co-pending application Serial No. 580,587, filed April 25, 1956.

Vehicles currently in use on the highways and particularly large trucks and the like tend to throw mud, stones, and the like to the side and to the rear of the rear wheels as these vehicles move along. This flying material sometimes obstructs the view of passing drivers by striking their windshield.

The wheel guard of this invention is so constructed as to intercept mud, stones, and the like kicked up by the wheels of the moving vehicle. In addition, the structure of the wheel guard also serves as a support for a removable warning sign. Thus, when the vehicle is stopped or stalled on the highway the warning sign may be removed and used to warn approaching motorists.

Another advantage of this invention lies in its substantially rigid mounting on a vehicle. In many prior art wheel guard constructions, a problem arose when these devices were used on tandem, semi, or dump trucks, and the like. The body or main portion of trucks oftentimes moves in a manner unrelated to the wheels. Thus, it was often necessary to move or remove the wheel guards when the body of the truck was moved, for instance in dumping a dump truck. Because of the mounting of this invention this problem is eliminated. Thus, the wheel guard may be mounted on the vehicle frame where it remains relatively fixed in position regardless of any unrelated movement of the vehicle body.

Moreover, this mounting permits a warning sign to be firmly yet detachably mounted on the wheel guard, thus being capable of ready removal for use as a warning sign. Furthermore, this warning sign may be located in a plurality of positions so as to allow the operator to choose the height above the ground level at which he wishes the sign to be located for various weather conditions.

Other objects and advantages will become apparent from the following description taken in connection with the accompanying drawings, of which:

Figure 1 is a perspective view showing a truck equipped with guards embodying the invention;

Figure 2 is a fragmentary side elevational view illustrating the invention;

Figure 3 is an enlarged perspective view of a bracket support member;

Figure 4 is a side elevational view illustrating the use of a portion of the device as a warning sign;

Figure 5 is a fragmentary end elevational view of the wheel guard as shown in Fig. 2 without the warning sign attached;

Figure 6 is a fragmentary enlarged front view of a portion of the mounting bracket support and guard;

Figure 7 is a perspective view of the wheel guard before attachment to the vehicle;

Figure 8 is an end view of the warning sign as shown in Fig. 2 partially broken away in sections;

Figure 9 is a side elevational view somewhat similar to Fig. 2 showing a further embodiment of the wheel guard;

Figure 10 is an end elevational view of the rear of the guard shown in Fig. 9; and Figure 11 is a plan view of the wheel guard shown in Fig. 9.

The wheel guard 10 of this invention comprises an arcuate shield 11 and a mounting means including a pair of brackets 12, 12a, and a support member 13. A warning sign 14 may, if desired, be attached to the rear of the support member 13.

The arcuate shield 11 includes a pair of arcuate angle irons 15 which preferably comprise an arc of a circle similar to but larger than the circle of the vehicle wheel 16. To the curved angle irons 15 is attached a curved piece of sheet metal 17 by means of spot welding, riveting, or the like. The shield 11 is further strengthened by means of a pair of straight angle irons 18 which are attached across the front and rear of the shield in a manner similar to the curved angle irons 15. Thus, a rigid, durable structure is provided.

The shield 11 is mounted on the vehicle by means of the pair of brackets 12, 12a, and the rear support member 13. The front bracket 12 is attached to the upper straight angle iron 18, as shown in Fig. 7, by means of spot welding or the like. The rear bracket 12a is attached to the support member 13 in a similar manner. The support member 13 includes a pair of straight angle irons 19 which are welded or riveted to the guard 10 at the base of the support member as shown in Fig. 7 at 20. The angle irons 19 are strengthened by means of a transverse angle iron 21 which is welded or riveted at right angles to the irons 19. The bracket 12a is then welded or riveted across the top of the straight angle irons 19, thus giving a strong support.

The L-shaped portion 22 of the brackets 12 and 12a are securely attached to the frame 23 of the vehicle on which the wheel guard is to be used by means of rivets 22a or the like. As shown in Fig. 2, the vehicle illustrated is of the dump truck type and, thus, the box or body 24 of the truck may be in the down position as shown in the heavy lines in Fig. 2 or in the raised position 24a as shown in the dotted lines. Regardless of the movement of the truck body 24, however, the wheel guard remains in a relatively fixed position relative to the rear wheel 16 because of its attachment to the frame 23.

The warning sign 14 is constructed of a flat sheet metal piece 25 on which is preferably secured a luminous sign portion 26. A welded frame 27, also composed of straight angle irons, is attached by welding to the flat metal piece 25 to strengthen the sign 14 and a pair of supporting arms or rods 28 is rotatably attached to the frame 27 as shown at 29 in Fig. 4. These rods 28 may be conveniently located in storage position adjacent to the frame member 27 when the sign is attached to the support member 13.

The support member 13 has two sets of studs 31 and 31a, which are arranged to receive the warning sign 14 through corresponding sets of holes 32 and 32a in the sign. The sign is locked in position on the studs 31 and 31a by means of the latches 33 which rotate about pins 33a and receive the studs 31 and 31a in the V-shaped portion 34. Because of the arrangement of the pairs of studs 31 and 31a and the pairs of holes 32 and 32a, the sign may be located in a normal running position as shown in solid lines in Fig. 2, or in a storage position as shown in dotted lines in Fig. 2. This may be done by placing the lower set of holes 32a over the upper set of studs 31 and locking the studs 31 by means of the latches 33. The position at which the warning sign is preferably located is, of course, determined by the varying weather conditions that are met under normal truck operations. Thus, in extremely snowy or muddy weather it would be advisable to locate the sign member in the upper position to avoid undue damage.

A rubber or the like sheet 37 may be attached to the lower portion of the warning sign as by means of rivets or studs 38. This sheet further prevents wheel debris from being thrown to the wheel guards as do the curved metal sides 39 which are also riveted or spot welded to the curved angle irons 15.

A second or further embodiment of the mounting of the wheel guard is shown in Figs. 9, 10, and 11. The arcuate shield 11 is not changed in this embodiment, the only change being in the mounting, which is useful with stationary body type trucks. This mounting includes four straight bars made of angle iron 40, 41, 42, and 43. These bars are rigidly attached by means of welding or the like to the curved angle irons 15. Thus, two of the bars 40 and 42 are attached to the front of the guard 10 at 44 extending in a generally upward direction and the other two bars 41 and 43 are attached in a generally upright position in the same manner at the rear 45 of the guard 10.

The length of these bars may be varied so that when they are attached to the overhead of the truck body 46 at 47 by welding and the like, they will govern the location of the arcuate shield 11 in relation to the wheel 16.

The rear two bars 41 and 43 define a surface on which a warning device such as a sign may be located. Thus, the studs 31 and 31a are located on the rear of the bars 41 and 43 in the same manner as the studs 31 and 31a are located on the rear of the support member 13 shown in Fig. 5. The warning sign 14 may thus be attached to the rear of this mounting in the same manner as previously described with respect to the first embodiment.

Having thus described my invention as related to the embodiments shown in the accompanying drawings, it is my intention that the invention be not limited by any of the details of description unless otherwise specified, but rather be construed broadly within its spirit and scope as set out in the accompanying claims.

I claim:

1. A wheel guard for a vehicle structure comprising: an arcuate shield adapted to be mounted to overlie a portion of the periphery of said wheel when in operative position to arrest movement of particles thrown rearwardly by the rotary motion of said wheel, a mounting means including a pair of brackets adapted to be secured to a vehicle frame member, said brackets having spaced supporting members fixed to opposite end portions of said shield to secure said shield in operative position, the rear one of said supporting members extending generally in an upright direction and having an exposed outer surface of a size to mount a warning device for said vehicle, and means on said upright supporting member for attaching said warning device.

2. A wheel guard for a vehicle structure comprising: an arcuate shield adapted to be mounted to overlie a portion of the periphery of said wheel when in operative position to arrest movement of particles thrown rearwardly by the rotary motion of said wheel, and a pair of L-shaped brackets adapted to be attached to a vehicle frame member to secure said shield in operative position; one of said brackets being secured to and extending transversely of the front end portion of said shield and the second bracket being secured to a support member extending in a generally upright direction, the lower portion of said support member being adapted to support the rear end portion of said shield, the rear portion of said support member having an exposed outer surface of a size to mount a warning device for said vehicle, and means on said upright support member for removably attaching the warning device in a plurality of positions.

3. A wheel guard for a vehicle structure comprising: an arcuate shield adapted to be mounted to overlie a portion of the periphery of said wheel when in operative position to arrest movement of particles thrown rearwardly by the rotary motion of said wheel, and a pair of L-shaped brackets adapted to be attached to a vehicle frame member to secure said shield in operative position, one of said brackets being secured to and extending transversely of the front end portion of said shield, and the second bracket extending transversely of said shield and being secured to a rectangular support member extending in a generally upright direction, the lower portion of said support member being secured to the rear end portion of said shield, the rear portion of said support member having an exposed outer surface of a size to mount a warning device for said vehicle and said upright support member having means including two pairs of studs for lockably attaching said warning device in a plurality of positions.

4. A wheel guard for a vehicle structure comprising: an arcuate shield adapted to be mounted to overlie a portion of the periphery of said wheel when in operative position to arrest movement of particles thrown rearwardly by the rotary motion of said wheel, a mounting means including a plurality of spaced bars extending in a generally upright direction, the upper portion of said bars being adapted to be attached to said vehicle and the lower portion of said bars being adapted to support said shield in operative position, said bars defining an exposed outer surface of a size to mount a warning device for said vehicle, and means on said bars for attaching said warning device.

5. A wheel guard for a vehicle structure comprising: an arcuate shield adapted to be mounted to overlie a portion of the periphery of said wheel when in operative position to arrest movement of particles thrown rearwardly by the rotary motion of said wheel, and two pairs of spaced bars extending in a generally upright direction, the upper portion of said bars being adapted to be attached to said vehicle and the lower portion of one of said pairs secured to the front end portion of said shield, the lower portion of the second of said pairs being secured to the rear end portion of said shield to secure said shield in an operative position, said second pair of bars defining an exposed outer surface of a size to mount a warning device for said vehicle, and said second pair of bars having means including two pairs of studs for lockably attaching said warning device in a plurality of positions.

References Cited in the file of this patent

UNITED STATES PATENTS

| 2,546,781 | Rheeling | Mar. 27, 1951 |
| 2,591,196 | Post | Apr. 1, 1952 |
| 2,605,119 | Earnest | July 29, 1952 |
| 2,679,403 | Howard | May 25, 1954 |
| 2,771,304 | La Pere | Nov. 20, 1956 |